United States Patent

Wood et al.

[11] Patent Number: 5,863,566
[45] Date of Patent: Jan. 26, 1999

[54] DOUGH MANIPULATION APPARATUS

[75] Inventors: Paul Wood, Peterborough; Martyn Thomas Wray, Stamford, both of England

[73] Assignee: APV UK Limited, Crawley, England

[21] Appl. No.: 836,214

[22] PCT Filed: Nov. 7, 1995

[86] PCT No.: PCT/GB95/02607

§ 371 Date: Jul. 9, 1997

§ 102(e) Date: Jul. 9, 1997

[87] PCT Pub. No.: WO96/15675

PCT Pub. Date: May 30, 1996

[30] Foreign Application Priority Data

Nov. 8, 1994 [GB] United Kingdom .................. 9422506
Jun. 9, 1995 [GB] United Kingdom .................. 9511806

[51] Int. Cl.⁶ ............................... A21C 3/02; A21C 9/08; A21C 11/10
[52] U.S. Cl. ........................ 425/130; 425/296; 425/308; 425/363; 425/373; 425/403.1; 426/502; 426/503; 426/517; 426/518
[58] Field of Search ................... 426/502, 503, 426/517, 518; 425/296, 308, 363, 373, 315, DIG. 201, 130, 403.1

[56] References Cited

U.S. PATENT DOCUMENTS

| | | | |
|---|---|---|---|
| 1,883,592 | 10/1932 | Crosland | 426/502 |
| 3,917,856 | 11/1975 | Wong et al. | 426/502 |
| 4,518,617 | 5/1985 | Haas, Sr. et al. | 426/502 |

FOREIGN PATENT DOCUMENTS

| | | | |
|---|---|---|---|
| 1487071 | 6/1967 | France. | |
| 2007744 | 1/1970 | France. | |
| 2226804 | 11/1974 | France. | |
| 2553752 | 6/1977 | Germany | 426/502 |
| 3411428 | 10/1985 | Germany | 426/502 |
| 2159687 | 12/1985 | United Kingdom | 426/502 |

*Primary Examiner*—Khanh P. Nguyen
*Attorney, Agent, or Firm*—Kane, Dalsimer, Sullivan, Kurucz, Levy, Eisele and Richard

[57] ABSTRACT

There is described dough manipulation apparatus for use with a biscuit cutting machine, wherein the apparatus is operable to form and then manipulate dough sheets before output of the sheets to the biscuit cutting machine. A sheet forming unit and a sheet laminating unit, and means for controlled bypass of the sheet laminating unit whereby output of sheets produced by the sheet forming unit can be passed to the biscuit cutting machine, without lamination, make up the dough manipulation apparatus.

18 Claims, 5 Drawing Sheets

DOUGH MANIPULATION APPARATUS

BACKGROUND OF THE INVENTION

1. Field of the Invention

This invention relates to dough manipulation apparatus and is concerned with dough manipulation apparatus for use with biscuit cutting machines.

2. Brief Description of Related Art

Traditional methods of the manufacture of biscuits on an industrial scale involve the production of a continuous sheet of dough. The dough is usually mixed in batches which are then deposited in the hopper of a dough sheeting unit or 'sheeter'. The dough mass is drawn from the hopper down through rollers so as to form a continuous sheet which is then conveyed to the biscuit cutting machine where the required forms of biscuits are cut from the sheet. The biscuit forms are then conveyed to an oven. The remainder of the dough sheet, being 'scrap', is usually returned to the hopper of the sheeter for reprocessing.

Various types of biscuit product can be made from dough that has been sheeted in this manner. Dependent upon the type of product to be produced, the dough consistency will vary from a soft, relatively inelastic material to one of a relatively tough, springy, elastic consistency. Additionally, in order to produce a product with particular characteristics it is beneficial and, for some products, necessary to produce a laminated dough sheet.

The lamination process involves the production of a laminate formed by several separate sheets laid one on top of the other. This process enables the option of depositing a fat/flour mixture between the sheets. However, many biscuit products benefit from the lamination process without the inclusion of deposits between the sheets.

SUMMARY OF THE INVENTION

According to the present invention, dough manipulation apparatus for use with a biscuit cutting machine, wherein the apparatus is operable to form and then manipulate dough sheets before output of said sheets to the biscuit cutting machine, comprises a sheet forming unit and a sheet laminating unit, and means for controlled bypass of the sheet laminating unit whereby output of sheets produced by the sheet forming unit is passed to the biscuit cutting machine, without lamination or, alternatively, by turning the sheets through a substantial angle to the sheet laminating unit and then to the biscuit cutting machine.

FR-A-2007744 relates to a machine for preparing pasta products which has a length-adjustable, and inclinable table whereby the products can be selectively passed to one of two belt conveyors.

However, unlike the present invention which results in a very compact plant, the design of the FR-A-2007744 machine results in one which is extremely long.

The means for controlled bypass of the sheet laminating unit may comprise sheet diverter means and means whereby the diverter means can be selectively brought into and taken out of operation.

The sheet diverter means preferably comprise a diverter bar disposed at an angle to the direction of sheet travel, and sheet support rollers extending from, and supported by, said bar.

The sheet diverter means may further comprise a plurality of secondary rollers coaxially aligned with said first-mentioned rollers and movable towards and away from the first-mentioned rollers along the common axes of both the rollers.

Alternatively, the means for controlled bypass of the sheet laminating unit may comprise sheet diverter means employing reversible conveyor means and means for reversing the direction of travel of the conveyor means, the arrangement being such that in one direction dough sheet produced by the dough sheet forming unit can be conveyed to the sheet laminating unit and in the opposite direction said dough sheet can be conveyed directly to the biscuit cutting machine.

In such an arrangement, the dough sheet forming unit may be duplicated and comprise a pair of sheet forming units, each comprising a hopper and a set of co-operating rolls, the units being disposed above the reversible conveyor means.

The invention also comprises the combination of the dough manipulation apparatus and a biscuit cutting machine.

The biscuit cutting machine and sheet forming unit of the apparatus are preferably in alignment.

Conveyor means are preferably provided whereby laminated sheets produced by the sheet laminating unit travel along a substantially right-angled path to said biscuit forming machine.

Hitherto, in order to provide either laminated or sheeted dough, the provision has been required of dedicated lines for either product. The requirement to produce both laminated and sheeted products has required the duplication of the biscuit cutting equipment and the provision of multiple conveyors. Thus significant expense and, more importantly, a large space or footprint is required to accommodate both the sheeted and laminated features within a 'dual purpose' line of plant.

On the other hand, the present invention provides a combination sheeter and sheet laminator, within a reduced footprint as compared with conventional equipment, whereby production of either sheeted or laminated dough is selectable.

An embodiment of the present invention will now be described, by way of example only, with reference to the accompanying drawings.

DETAILED DESCRIPTION OF THE PREFERRED EMBODIMENTS OF THE INVENTION

Figure 1:
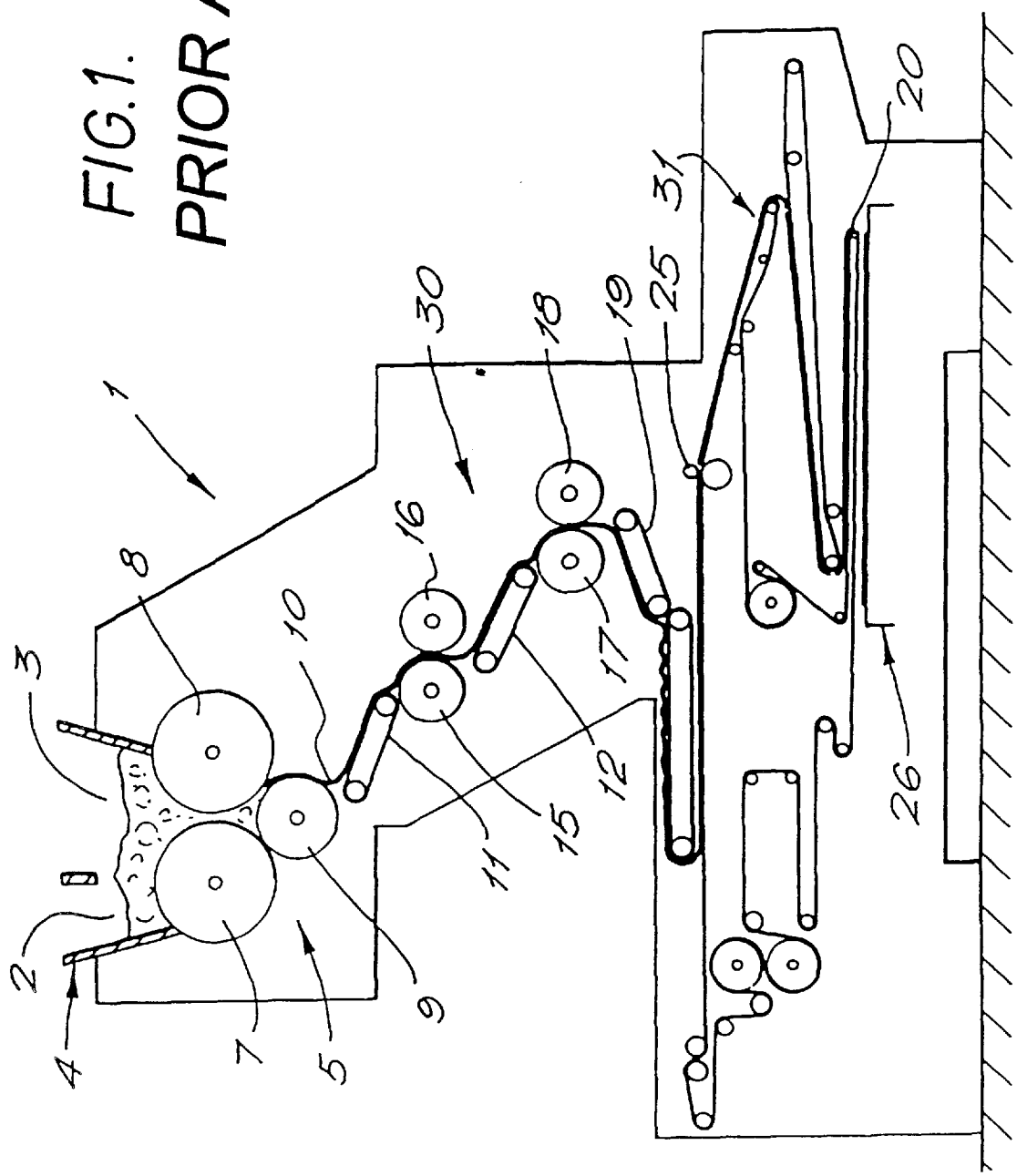
FIG. 1 is a side view which illustrates prior art dough manipulation apparatus for producing laminated sheets.

With reference first to FIG. 1, in known dough manipulation apparatus 1 illustrated thereby, scrap and virgin dough is fed into compartments 2, 3 of the hopper 4 of a three-roll sheet forming unit or sheeter 5. The dough sheet 10 formed by the action of the two top rolls 7, 8 of the sheeter 5 is forced onto the bottom roll 9 of the sheeter.

The dough sheet 10 is conveyed (by conveyors 11, 12) to, and allowed to fall between, successively, two pairs of rolls, namely rolls 15, 16 and 17, 18 which flatten or 'gauge' the sheet 10 to a desired thickness. The roll pairs 15, 16/17, 18 and conveyor 12 therebetween, together form a gauge roll unit 30. The sheet 10 is further conveyed (by a conveyor 19) to a laminating unit 31 incorporating a reciprocation conveyor 20 where sheet 10 is alternately cut into lengths by a knife 25 and then deposited onto the takeaway conveyor 26 to be conveyed to a biscuit cutting machine (not shown). As can be appreciated, the takeaway conveyor 26 runs at right-angles to the direction of the dough sheet 10 as it is processed in the sheeter and gauge roll sections of the apparatus 1. For sheeted products, the conveyor 11 from the sheeter is arranged to feed sheet 10 directly onto a takeaway conveyor which then conveys the sheet to the biscuit cutting machine.

Figure 2:
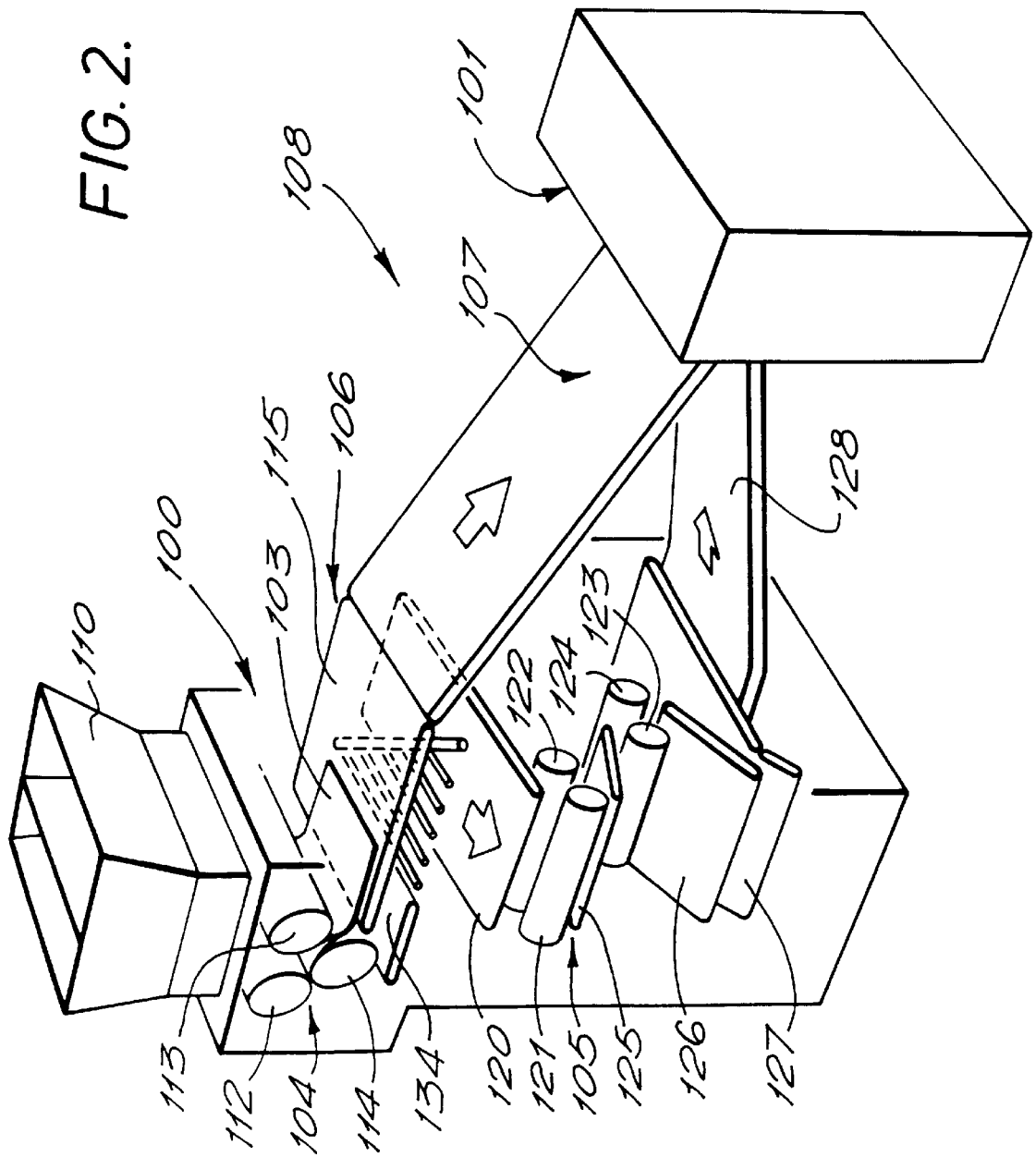
FIG. 2 is a view in perspective of a biscuit production plant incorporating dough manipulation apparatus according to the present invention.

With reference now to FIG. 2, dough manipulation apparatus 100 is shown thereby, in combination with a biscuit cutting machine 101.

The combination provides a production plant 108.

The apparatus 100 is operable to form and then manipulate dough sheets 103 before output of the sheets to the biscuit cutting machine 101.

The apparatus 100 comprises a sheet forming unit, or sheeter 104, a sheet laminating unit 105 and means 106 for controlled bypass of the sheet laminating unit 105, whereby output of sheets 103 produced by the sheeter 104 can be passed, by downwardly-inclined conveyor 107, direct to the biscuit cutting machine 101, without lamination The sheet forming unit or sheeter 104, comprises a hopper 110 where a mixture of scrap and virgin dough is fed into the hopper, and three co-operating rolls, namely an upper pair 112 and 113, and a lower roll 114.

The dough sheet 103 is formed by the action of the upper roll pair 112, 113 and is then forced downwardly over the lower roll 114 on to conveyor 115, which transfers the sheet 103 to conveyor 107 and thence to the biscuit cutting machine 101.

The sheet laminating unit 105 comprises an upper conveyor 120, a co-operating upper pair of rolls 121, 122 which flatten or gauge the sheet 103 to a required thickness, a lower pair of co-operating rolls 123, 124 which repeat the process, a conveyor 125 between the upper and lower pairs of rolls and further conveyors 126, 127, 128 which transport laminate sheets of dough to the biscuit cutting machine 101. The conveyor 128 is upwardly inclined and is disposed in substantial alignment with downwardly inclined conveyor 107, so that the superimposing conveyors 128, 107, converge.

A dough sheet cutting knife (not shown) is incorporated in the unit 105.

It will be noted the conveyors 126, 127, 128 co-operate in supplying laminate sheets to the biscuit cutting machine 101 along a path substantially normal to the path of sheet material through the roller pairs 121, 122/123, 124 and in substantial vertical alignment with conveyor 107.

Figure 3:
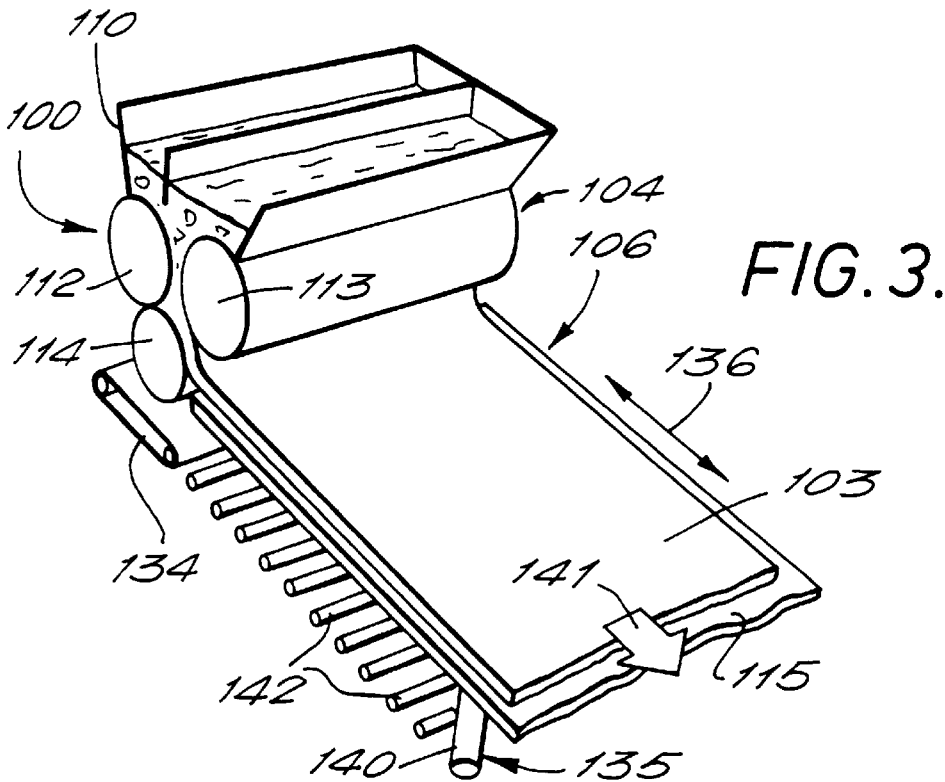
FIG. 3 is a view in perspective of the apparatus of FIG. 2, in one mode of operation.
Figure 4:
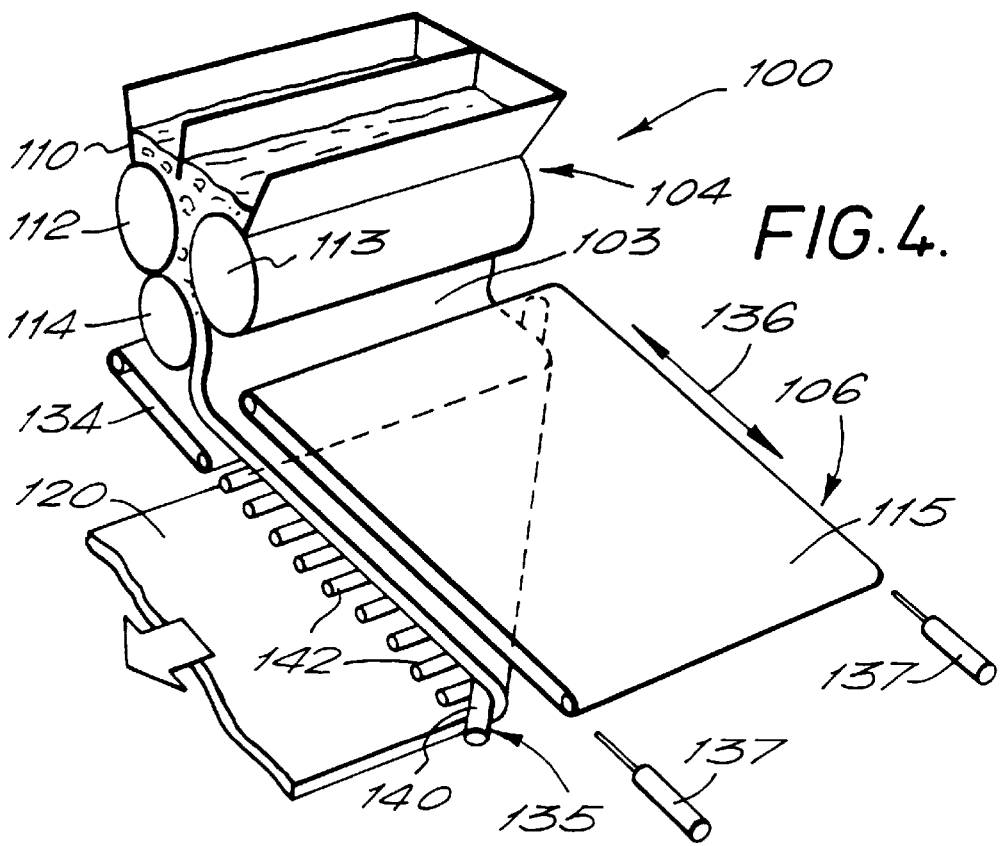
FIG. 4 is a view in perspective of the same apparatus, but in another mode of operation.

With additional reference to FIGS. 3 and 4, the bypass means 106 comprise the conveyor 115, a further conveyor 134 disposed beneath the lower roll 114, and a diverter device 135. The conveyor 115 is movable substantially horizontally, as indicated by double-headed arrow 136, from a position relatively close to the bottom roll 114 (FIG. 3) to another position (FIG. 4), relatively remote therefrom. This movement of the conveyor 115 is achieved by actuators 137 (FIG. 4 only). The actuators 137 provide means for selectively bringing the bypass means 106 into, and out of, operation.

The diverter device 135 is disposed immediately below the conveyor 115 so as to be in close proximity thereto. The device 135 is stationary and comprises a diverter bar 140 disposed at substantially 45° to the general plane of the conveyor 115, that is, the direction of travel 141 of the sheet 103, and a plurality of equi-spaced dough sheet support rollers 142 extending from and supported by the bar 140. Common ends of the rollers 142 are rotatably mounted on the diverter bar 140, so that the rollers extend from the bar 140 in a cantilever-like manner.

The device 135 has a plan form generally like that of a right-angled isosceles triangle, the hypotenuse of which comprises the bar 140, which extends across a little more than the full width of the dough sheet 103.

The device 135 is disposed substantially co-planar with the conveyor 134.

With reference to FIG. 4, to bring the laminator 105 (FIG. 2) into operation, the actuators 137 are operated so as to pull the conveyor 115 away from the lower roll 114 of the sheeter 104.

Dough sheet 103 produced by the sheeter 104 can now pass downwardly on to the conveyor 134, and then over the rollers 142 of the diverter device 135 and beneath the retracted conveyor 115.

The sheet 103 then falls over the inclined bar 140 and on to conveyor 120 (FIG. 2) so that it is transported to the gauge rolls 121–124. Thereafter the sheet 130 is cut into lengths, the lengths superimposed on each other to form a laminate, and the laminate supplied to the biscuit cutting machine 101 by the conveyors 126–128.

Figure 5:
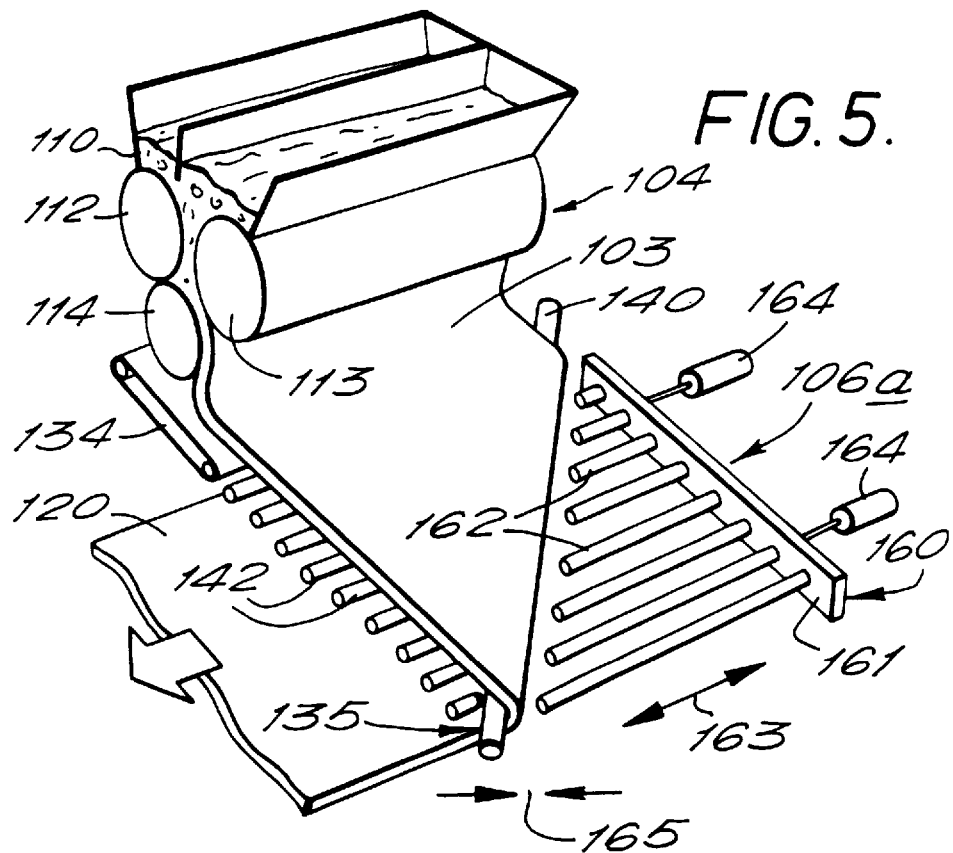
FIGS. 5 and 6 are views similar to FIGS. 3 and 4, which illustrate one modification.

In the arrangement illustrated by FIG. 5, modified means 106a is provided for controlled bypass of the sheet laminating unit 105 (FIG. 2).

The means 106a comprise movable structure 160 operable to render the diverter device 135 inoperative.

The structure 160 comprises a bar 161 having a row of equi-spaced sheet support rollers 162 extending from and supported by the bar 161, the rollers being rotatably mounted thereon, at common ends. Spacing of the rollers 162 is the same as with rollers 142. The structure 160 is movable, towards and away from the device 135, as indicated by the double-headed arrow 163, by actuators 164. Movement takes place in substantially the same horizontal plane occupied by the device 135.

With the structure 160 moved away from the device 135, the dough sheet 103 passes through the gap 165 formed between the device 135 and structure 160, in the manner shown in FIG. 4, on its way to the laminating unit 105.

Figure 6:
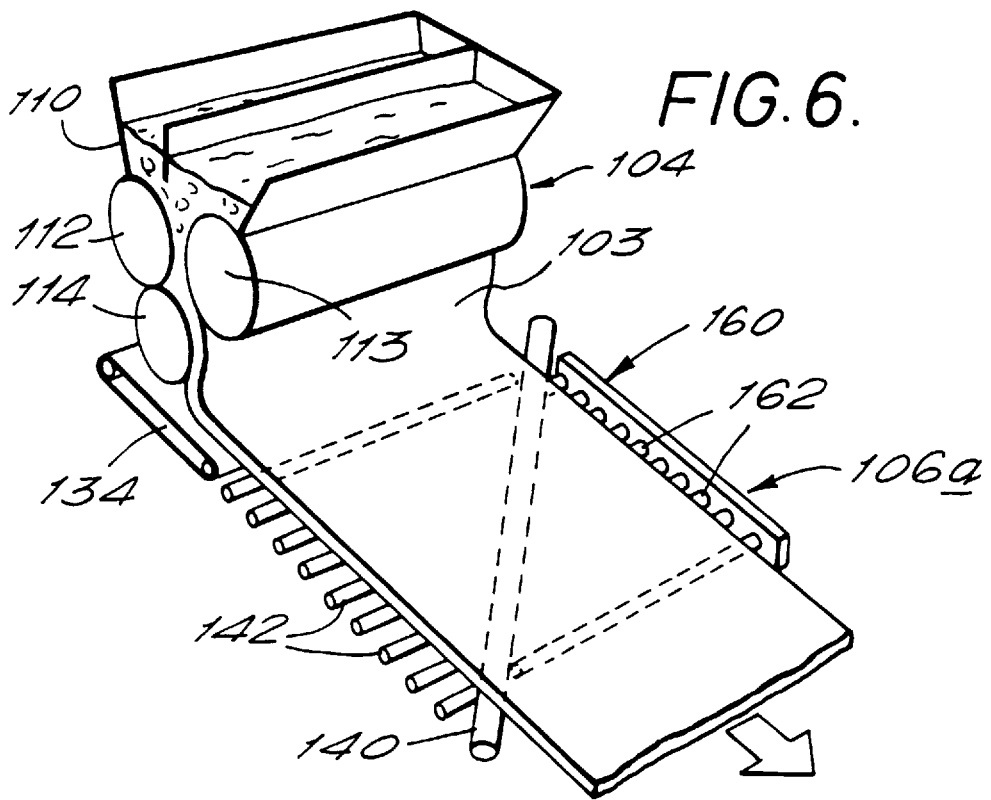

In FIG. 6, the structure 160 has been displaced by actuators 164 (FIG. 5) so that the 'free' ends of the rollers 162 are contiguous with the bar 140 of the device 135 and the rollers 162, 142 are coaxially aligned. Thus the gap 165 no longer exists and an effectively continuous support provided by the coaxially disposed rollers 142, 162 bypasses the laminator unit 105.

The actuators 164 provide means for selectively bringing the bypass means 106a into, and out of operation.

The modifications illustrated by FIGS. 5 and 6 allow the conveyor 115 of FIGS. 3 and 4 to be dispensed with.

Figure 7:
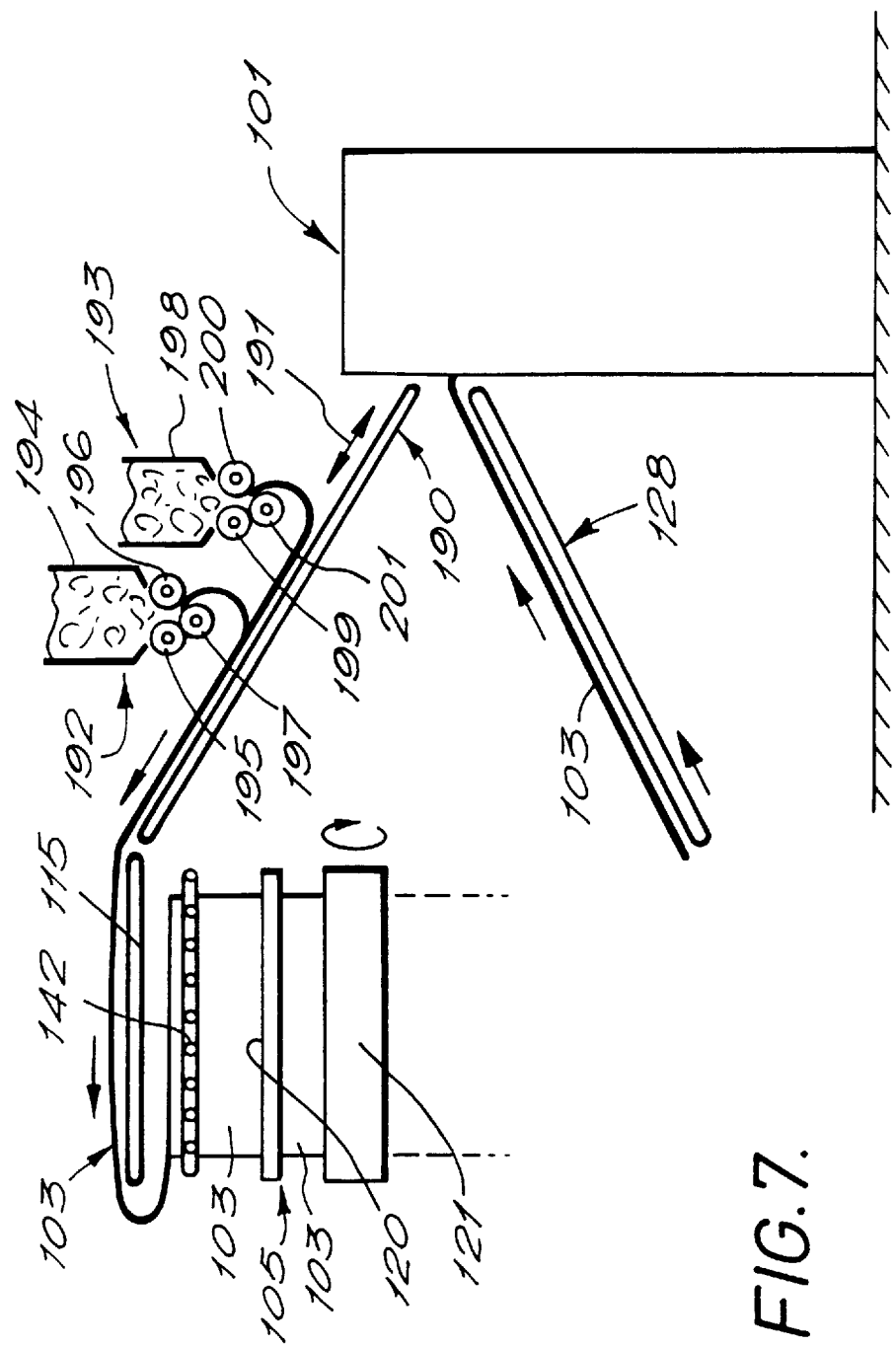
FIG. 7 is a semi-diagrammatic side view which illustrates another modification.

In the modification illustrated by FIG. 7, the endless conveyor 190 which corresponds to conveyor 107 of FIG. 2, is reversible in direction, as indicated by arrow 191.

Sheet laminating unit 105 and associated components are shown in FIG. 2. However, in this embodiment conveyor 115 is no longer movable, as shown in FIGS. 3 and 4. Here, in FIG. 6, dough sheet transported upwardly by conveyor 190, transfers to dough sheet delivery conveyor 115 and then downwardly on to the rollers 142 and from thence on to conveyor 120 etc (see FIGS. 2 and 4).

A pair of separate sheet forming units 192, 193 are disposed above the conveyor 190. Unit 192 comprises a hopper 194 and a set of three co-operating rolls 195, 196, 197. Unit 193, which is identical to unit 192, comprises a hopper 198 and a set of three co-operating rolls 199, 200, 201. Hopper 192 is fed with scrap dough and hopper 198 is fed with virgin dough.

The conveyor 190 comprises means for controlled bypass of the sheet laminating unit 105.

As shown, in one mode, the units 192, 193 produce dough sheet 103 which is carried up, by conveyor 190, to the sheet laminating unit 105. After lamination, the sheets are transferred to the biscuit cutting machine 101 by conveyor 128.

In the alternative mode, whereby the sheet laminating unit 105 is bypassed, the direction of the conveyor 190 is reversed. This results in dough sheet formed by unit 192 or 193 passing directly to the biscuit cutting machine 101.

In an alternative arrangement, the units 192, 193 could be disposed over conveyor 115.

The invention provides a combination apparatus which is compact and has a smaller footprint than that of the apparatus 1 of FIG. 1. For example, the combination apparatus of FIG. 2 has a plan area 25% to 35% smaller than that of FIG. 1, depending on operation requirements.

The invention allows the plan or floor area occupied by the combination apparatus of FIG. 2 to be not more than 5.00 square meters. (Actually 4.41 square meters.)

As the width of the dough sheets produced by the combination is substantially 1.00 meters, the combination can be said to occupy a floor area of not more than 5.00 square meters per 1.000 meter width of dough sheet produced by the combination.

This relationship can be scaled up or down. Thus, for example, to produce a dough sheet width of 1.2 meters, the floor area occupied by the combination need be no more than 6.00 square meters and, for a dough width of 0.9 meters, a floor area of not more than 4.5 square meters.

The relationship applies to any of the combinations (according to the invention) disclosed herein.

Placement of the sheeter rolls 112–114 directly above the gauge rolls 121–124 and within the full width of the sheeter 104 (see FIG. 2) contributes to providing a compact apparatus.

Furthermore, disposing the biscuit cutting machine 101 in alignment with the sheeter rolls 112–114 results in a compact production plant.

We claim:

1. Dough manipulation apparatus operable to form and then manipulate dough sheets, comprising;
  (a) a sheet forming unit (104, 192, 196) having a first sheet gauging section (112, 113, 114);
  (b) means (110) for supplying dough to the sheet forming unit (112, 113, 114);
  (c) sheet diverter means (135) for turning gauged dough sheets (103) produced by the sheet forming unit (104) through a substantial angle;
  (d) a sheet laminating unit (105) for accepting said turned sheets produced by the sheet forming unit, and having a second sheet gauging section (121, 122, 123, 124) and a sheet layering section (126);
  (e) upper (107) and lower (128) separate outlets from the apparatus, both connectable to the biscuit cutting machine;
  (f) said upper (107) outlet being disposed above said lower (128) outlet; and
  (g) selective control means (106) operable to provide a controlled by-pass of the sheet diverter means (135), said sheet gauging section (121, 122, 123, 124) and the sheet layering section (126);
    whereby said sheets produced by the sheet forming unit (104) pass direct to the biscuit cutting machine by way of said upper outlet (107), without being turned by said sheet diverter means (135) and without subsequent passage through the sheet layering section (126).

2. Apparatus as claimed in claim 1, wherein the sheet diverter means (135) comprise a diverter bar (140) disposed at an angle to a direction of sheet travel, and sheet support rollers (142) extending from and supported by said bar (140).

3. Apparatus as claimed in claim 2 wherein the sheet diverter means (135) further comprise a plurality of secondary rollers (162) coaxially aligned with said sheet supporting rollers (142) and movable towards and away from the sheet supporting rollers (142) along the common axes each defined by the coaxially aligned pair of the sheet supporting and secondary rollers.

4. Apparatus as claimed in claim 1, wherein the sheet forming unit (104) comprises three co-operating rolls, including an upper pair of rolls (112, 113) and a lower roll (114) and conveyor means (115) for receiving dough sheet (103) formed by the sheet forming unit (104), said conveyor means (115) being movable from one position relatively close to the lower roll (114) to another position relatively remote therefrom.

5. Apparatus as claimed in claim 4, wherein in said one position dough sheet (103) passes over said conveyor means (115), and in said another position dough sheet (103) passes under said conveyor means (115).

6. Apparatus as claimed in claim 3, wherein said secondary rollers (162) are movable from one position whereby dough sheet (103) passes downwardly through a gap (165) formed between the aligned sheet supporting rollers (142) and said secondary rollers (162), to another position whereby said gap (165) is closed, and dough sheet (103) then passes over both the sheet supporting rollers (142) and the secondary rollers (162).

7. Apparatus as claimed in claim 1, wherein the selective control means (190) comprises said sheet diverter means employing reversible conveyor means (190) and means for reversing the direction of travel of the conveyor means, the arrangement being such that in one direction dough sheet (103) produced by the dough sheet forming unit can be conveyed to the sheet laminating unit (105) and in the opposite direction said dough sheet (103) can be conveyed directly to the biscuit cutting machine (101).

8. Apparatus as claimed in claim 7, wherein the dough sheet forming unit (192, 193) is duplicated.

9. Apparatus as claimed in claim 8, wherein each dough sheet forming unit comprises a hopper and a set of co-operating rolls.

10. Apparatus as claimed in claim 4, wherein said conveyor means (115, 190) is disposed so as to be in alignment with a biscuit cutting machine (101).

11. Apparatus as claimed in claim 4, wherein said sheet laminating unit (105) comprises an upper conveyor (115) for receiving dough sheet (103), and for transporting the dough sheet in a direction substantially normal to the axes of the three co-operating rollers (112, 113, 114) of the sheet forming unit (104), and for then delivering the sheet (103) to a first pair of co-operating gauge rolls (121, 122) having axes disposed substantially normal to the axes of the rollers (112, 113, 114) of the sheet forming unit (104), said first pair of co-operating gauge rollers (121, 122) being disposed below said upper conveyor (115), a second pair of co-operating gauge rollers (123, 124) disposed beneath said first pair, the axes of the second pair of rollers (123, 124) also being disposed substantially normal to the axes of the rollers (112, 113, 114) of the sheet forming unit (104), a lower conveyor (125) being disposed between said first and said second pairs of gauge rollers, and operable to transport dough sheet (103) from said first pair of gauge rollers to said second pair of gauge rollers, and further conveyors (126, 127, 128) disposed beneath the second pair (123, 124) of gauge rollers and operable to transport dough sheet (103) to a said biscuit cutting machine (101), along a path extending substantially normal to the axes of the three co-operating rollers (112, 113, 114) of the sheet forming unit (104).

12. Apparatus as claimed in claim 11, wherein said path is in alignment with said biscuit cutting machine (101).

13. Apparatus as claimed in claim 7, wherein the dough sheet forming unit (192, 193) is disposed above the reversible conveyor means (190).

14. Apparatus as claimed in claim 7 wherein the sheet laminating unit (105) further comprises a conveyor for delivery of dough sheet (103) to a conveyor 120 from a sheet diverter bar (140) disposed at an angle to the direction of sheet travel, with sheet support rollers (142) extending from and supported by the bar (140).

15. Apparatus as claimed in claim 1 which further comprises
   (h) a biscuit cutting machine (101) spaced from the upper outlet (107); and
   (i) a pair of separate conveyor means (190, 128), in superimposing alignment with each other for carrying said sheet to the biscuit cutting machine (101) and joining the biscuit cutting machine (101), each conveyor means (128) being operable to transport dough sheets to the machine (101), one conveyor means (190) being operable to transport laminated dough sheets to the machine (101) and the other conveyor means (115) being operable to transport non-laminated dough sheets to said machine (101).

16. The combination of claim 15, wherein the combination occupies a floor area of not more than 5.00 square meters.

17. The combination of claim 15, wherein the combination occupies a floor area of not more than 5.00 square meters per 1.00 meter width of dough sheet produced by the combination.

18. Dough manipulation apparatus (100) as claimed in claim 1, in combination with a biscuit cutting machine (101).

* * * * *